(12) United States Patent
Hara et al.

(10) Patent No.: US 7,021,074 B2
(45) Date of Patent: Apr. 4, 2006

(54) WORK VEHICLE

(75) Inventors: Keiichi Hara, Sakai (JP); Kenzo Koga, Sakai (JP)

(73) Assignee: Kubota Corporation, Osaka (JP)

( * ) Notice: Subject to any disclaimer, the term of this patent is extended or adjusted under 35 U.S.C. 154(b) by 62 days.

(21) Appl. No.: 10/785,725

(22) Filed: Feb. 24, 2004

(65) Prior Publication Data
US 2005/0178136 A1 Aug. 18, 2005

(30) Foreign Application Priority Data

| Mar. 10, 2003 | (JP) | ............................. 2003-063867 |
| Mar. 10, 2003 | (JP) | ............................. 2003-063868 |
| Mar. 10, 2003 | (JP) | ............................. 2003-063870 |

(51) Int. Cl.
*B60H 1/32* (2006.01)

(52) U.S. Cl. .......................................... 62/244; 165/42
(58) Field of Classification Search .......... 62/239–244; 165/42–43
See application file for complete search history.

(56) References Cited

U.S. PATENT DOCUMENTS

| 4,344,356 | A | * | 8/1982 | Casterton et al. ........... 454/139 |
| 4,612,975 | A | * | 9/1986 | Ikari ........................... 165/43 |
| 4,874,036 | A | * | 10/1989 | Masuda ....................... 165/42 |
| 4,989,500 | A | | 2/1991 | Anliker et al. |
| 5,308,279 | A | * | 5/1994 | Grinberg ..................... 454/139 |
| 5,833,528 | A | | 11/1998 | Baum |
| 6,012,295 | A | * | 1/2000 | Isobe et al. ................... 62/131 |
| 2004/0187509 | A1 | * | 9/2004 | Yamakawa et al. ........... 62/244 |

FOREIGN PATENT DOCUMENTS

| FR | 2.176.346 | 10/1973 |
| JP | 6-6023 | 1/1994 |
| JP | 2001-97017 | 4/2001 |
| WO | WO 82/02086 | 6/1982 |

* cited by examiner

*Primary Examiner*—William E. Tapolcai
(74) *Attorney, Agent, or Firm*—The Webb Law Firm

(57) ABSTRACT

A work vehicle includes a cabin, a driver's seat provided in the cabin, a step disposed downwardly of the cabin for providing access for a driver to the driver's seat and an air conditioner for conditioning air inside the cabin, the air conditioner having an air conditioner body, an air inlet/outlet box, and a blower pipe for sending conditioned air from the air conditioner body to the air inlet/outlet box. The cabin includes an entrance door mounted to one lateral side thereof and includes the air inlet/outlet box mounted to the other lateral side thereof. The air conditioner body is disposed downwardly of the driver's seat and the blower pipe is disposed downwardly of the step.

9 Claims, 17 Drawing Sheets

WORK VEHICLE

BACKGROUND OF THE INVENTION

1. Field of the Invention

The present invention relates to a work vehicle, more particularly to a work vehicle including a cabin, a driver's seat provided in the cabin, a step disposed downwardly of the cabin for providing access for a driver to the driver's seat, and an air conditioner for conditioning air inside the cabin, the air conditioner having an air conditioner body, an air inlet/outlet box, and a blower pipe for sending conditioned air from the air conditioner body to the air inlet/outlet box.

2. Description of the Related Art

Some work vehicles such as a backhoe include an air conditioner for conditioning air inside a cabin. The air conditioner mounted on this type of work vehicle includes an air conditioner body, an inlet member (a portion of the air inlet/outlet box) for introducing ambient air into the air conditioner body, an outlet member (another portion of the air inlet/outlet box) for sending the conditioned air from the air conditioner body to the inside of the cabin, and a blower pipe for sending conditioned airs from the air conditioner body to the outlet member, with all these components being disposed within the cabin (see e.g. Japanese Utility Model "Kokai" No.: Hei. 6-6023).

With the conventional art, however, the air conditioner body, the inlet member, the outlet member and the blower pipe all limit the inside free space of the cabin, thereby to compromise the roominess inside the cabin or interfere with an operator's operation to be carried out therein.

The present invention addresses to the above-described problem. A primary object of the present invention is to provide an air conditioning apparatus for a work vehicle which solves the above problem, of the air conditioner body, the inlet member, the outlet member and the blower pipe limiting the inside free space of the cabin, thereby to compromise the roominess of the cabin or interfere with an operator's operation therein.

SUMMARY OF THE INVENTION

For accomplishing the above-noted object, according to the present invention, in the work vehicle described above, the cabin includes an entrance door mounted to one lateral side thereof and includes said air inlet/outlet box mounted to the other lateral side thereof, said air conditioner body is disposed downwardly of the driver's seat and said blower pipe is disposed downwardly of said step.

With the above construction, since the air conditioner body is disposed downwardly of the driver's seat, this air conditioner body does not limit the space inside the cabin or interfere with an operator's operation therein. Further, as the air inlet/outlet box is mounted to the other lateral side of the cabin not having the entrance door, this air inlet/outlet box too does not limit the space inside the cabin or interfere with an operator's operation therein. Moreover, as the blower pipe is disposed downwardly of the step, this blower pipe too does not limit the space inside the cabin or interfere with an operator's operation therein.

The air inlet/outlet box consists essentially of an inlet member for introducing ambient air into the air conditioner body and an outlet member for sending the conditioned air from the air conditioner body to the inside of the cabin. As these inlet and outlet members are provided as a single unit, i.e. as the box, the inlet and outlet members can be easily assembled and then mounted in the cabin and can also be easily connected to the air conditioner body. In this regard, according to one preferred embodiment of the present invention, the air inlet/outlet box includes a filter attachable and detachable from said one lateral side of the cabin and said one lateral side of the cabin includes an ambient air introducing window and a cover member for covering this ambient air introducing window, said filter being replaceable through said ambient air introducing window by opening said cover member. Further, said cover member includes an ambient air introducing hole communicating with said ambient air introducing window, said ambient air introducing hole being communicated via said ambient air introducing window and the ambient air filter with the side of the inlet member of the air inlet/outlet box. With this construction, by detaching the cover member from the one lateral side, an operator can insert e.g. his/her finger in the ambient air introducing window and remove a fixing member such as a bolt to dismount the ambient air filter from the ambient air introducing window, thereby to carry out replacement of this ambient air filter easily.

According to a further preferred embodiment of the present invention, the introduction of the ambient air from the air inlet/outlet box to the air conditioner body and the introduction of the inside air to the air conditioner body are effected at one time. With this construction, it is possible to introduce a sufficient amount of air into the air conditioner body to be conditioned thereby. To this end, preferably, there are provided an air introducing portion for effecting the introduction of the ambient air from the inlet member to the air conditioner body and the introduction of the inside air from the inside of the cabin to the air conditioner body, an ambient air feeding opening formed in a bottom face of the inlet member and an inlet pipe extending downwardly of the step for communicating the ambient air from said ambient air feeding opening to the air introducing portion. With this construction, in addition to the blower pipe, the inlet pipe too is dispose d downwardly of the step, so that this inlet pipe will not limit the space inside the cabin or interfere with an operator's operation therein.

Alternatively, the introduction of the ambient air from the air inlet/outlet box to the air conditioner body and the introduction of the inside air to the air conditioner body can be effected selectively. For instance, if either one of the ambient air and the inside air which has a temperature closer to a target air conditioning temperature is selectively introduced to the air conditioner body, efficiency of the air conditioning operation can be improved.

According to a still further preferred embodiment of the present invention, the work vehicle further comprises an engine disposed at a rear portion of a vehicle body and a cover member having a front wall for covering at least a front portion of the engine, an air conditioning medium pipe of the air conditioner being inserted through said front wall of the cover body, with an inserted portion of the medium pipe being sealed with a cushioning member. With this construction, after the air conditioning medium pipe is installed between an engine room (space inside an engine hood) and the inside of the cabin, the sealing between these spaces can be effected easily and efficiently.

Further and other features and advantages of the present invention will become apparent upon reading following detailed description of preferred embodiments thereof with reference to the accompanying drawings.

DESCRIPTION OF THE PREFERRED EMBODIMENTS

With reference to the accompanying drawings, a backhoe 1 as an example of a work vehicle relating to the present invention will be described.

Figure 1:
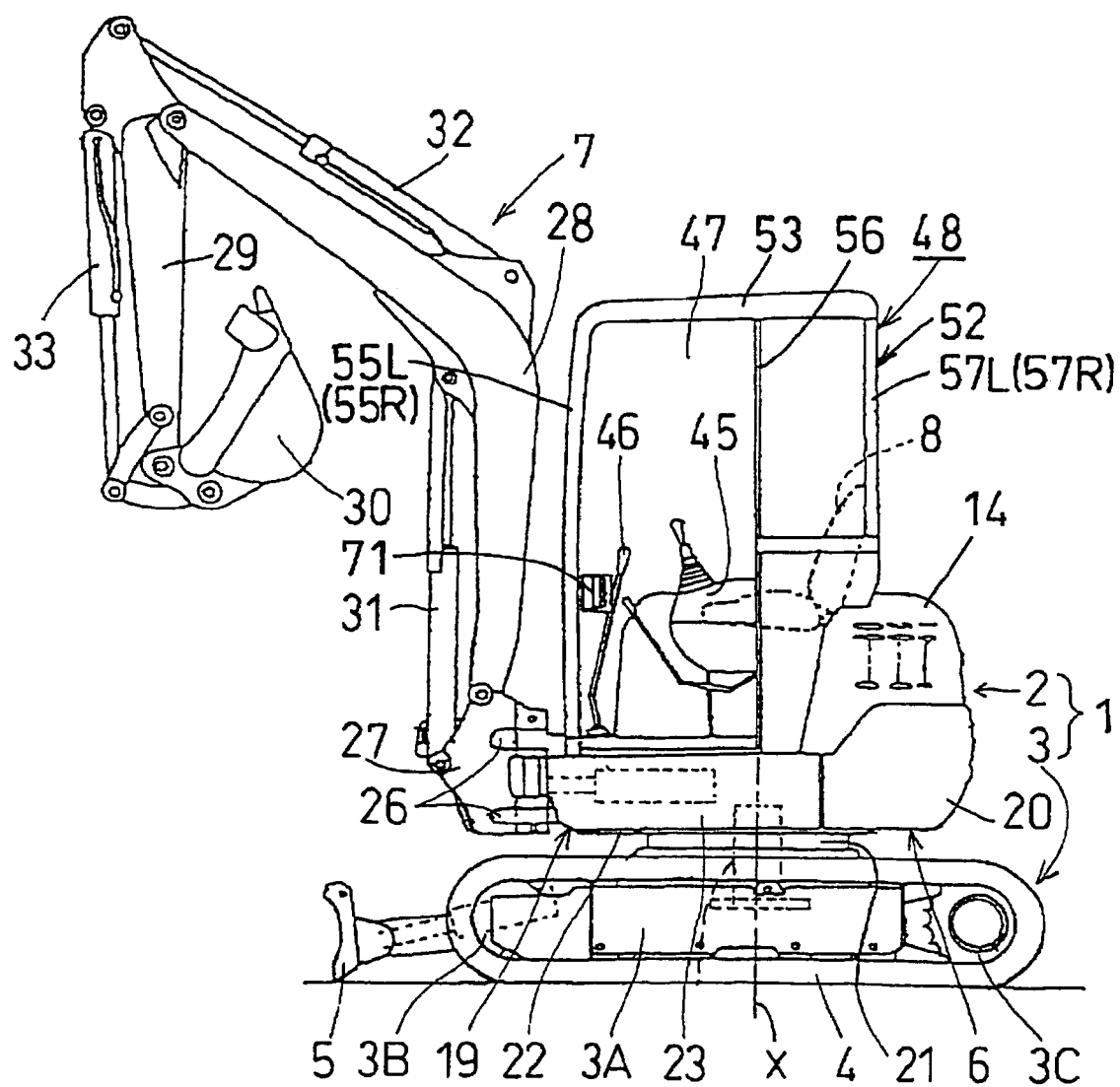
FIG. 1 is a side view of a backhoe.
Figure 2:
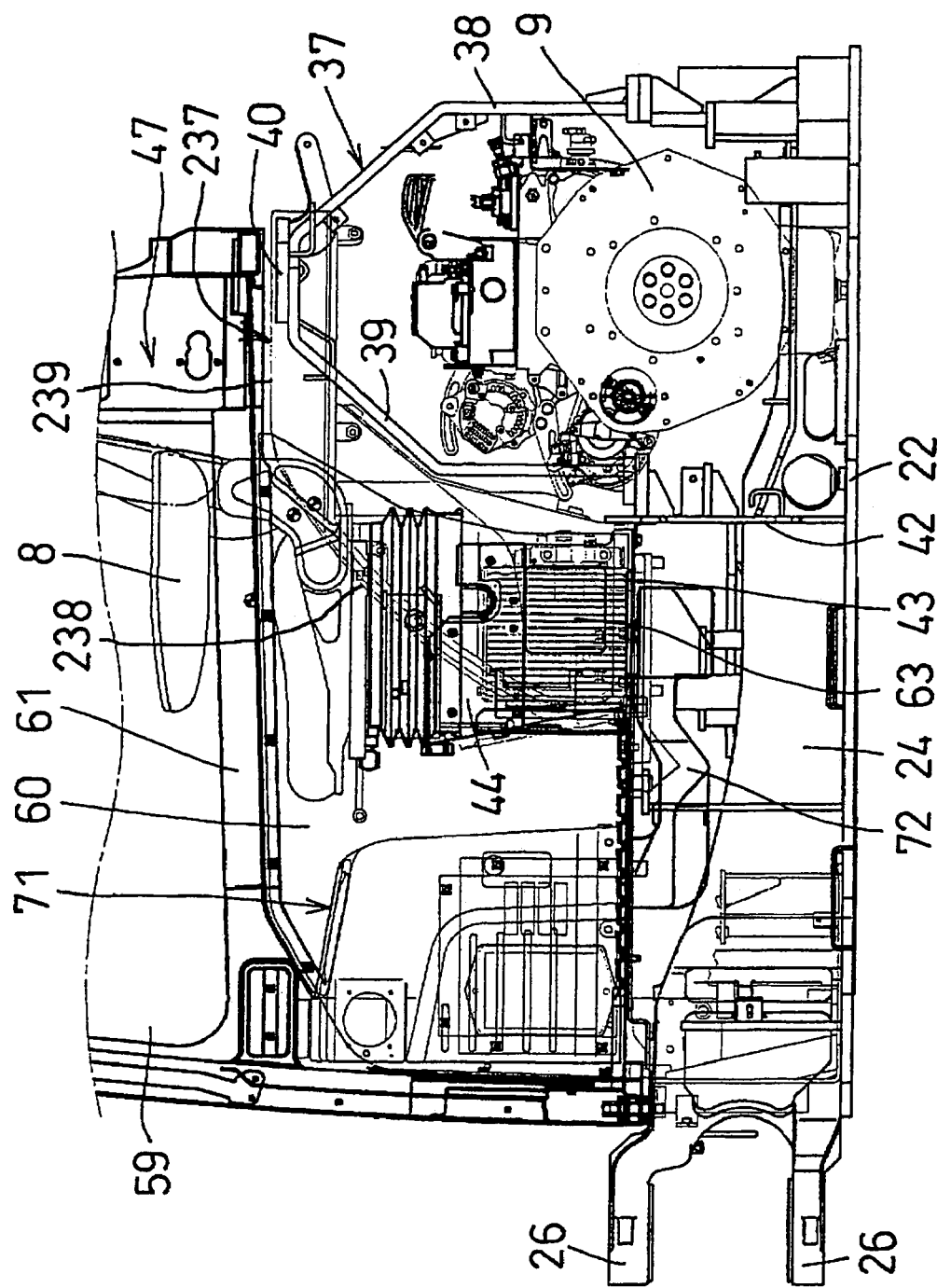
FIG. 2 is a side view showing a front portion and inside of an engine hood of the backhoe.
Figure 3:
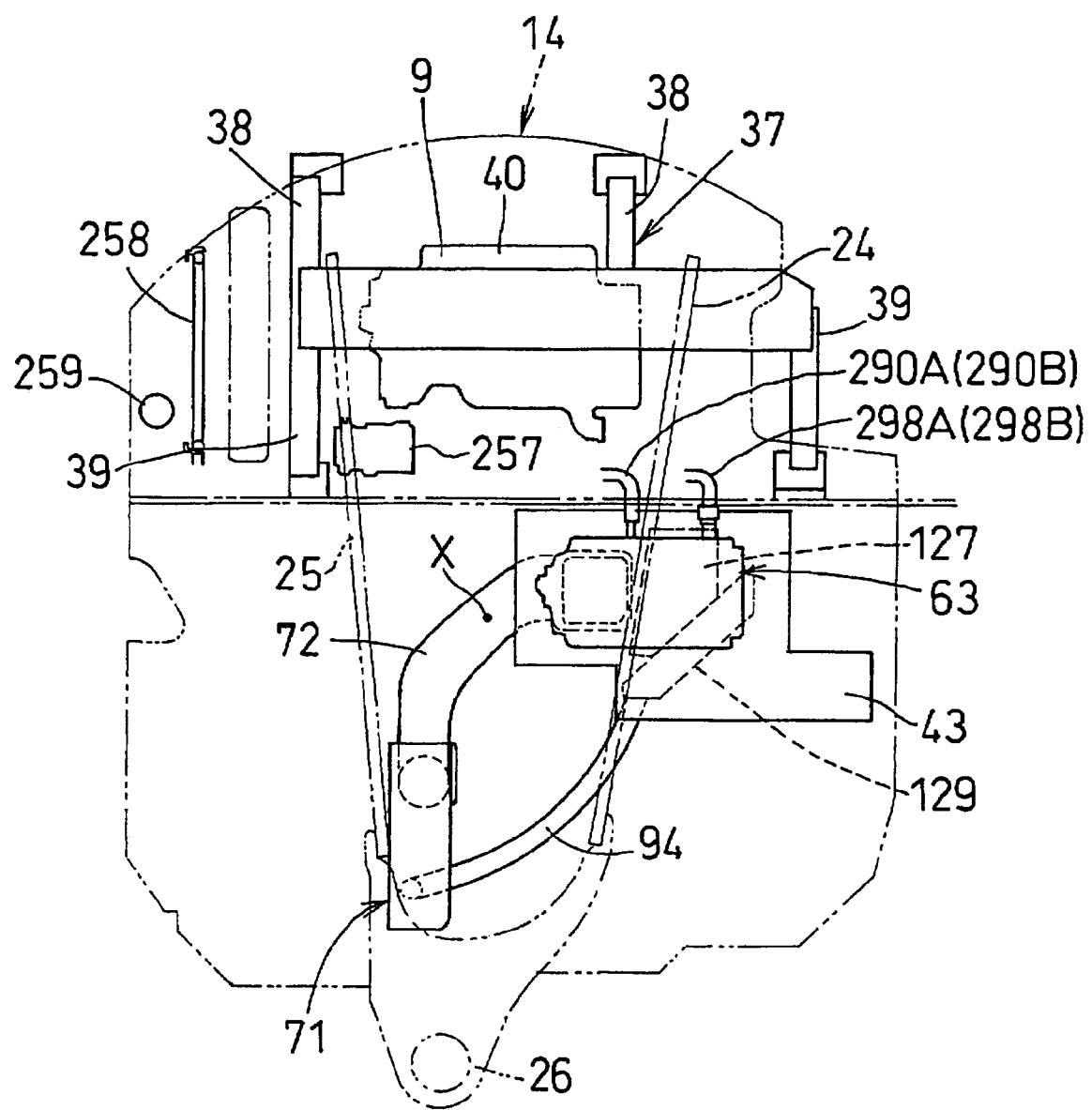
FIG. 3 is a plan view of the backhoe.

In FIGS. 1–3, this backhoe 1 includes a swiveling machine 2 disposed at an upper portion of the vehicle body and a traveling apparatus 3 disposed at a lower portion of the vehicle body.

In the following discussion, the traveling direction of the backhoe 1 (the right/left direction in FIG. 1) will be referred to as a fore/aft direction and a direction normal to his fore-aft direction (the depth direction in the plane of FIG. 1) will be referred to as a right/left direction.

In the traveling apparatus 3, a track frame 3A rotatably supports on the right and left sides thereof idlers 3B, drive wheels 3C, track rollers and carrier rollers. And, crawler traveling members 4 are entrained around these members and the drive wheels 3C are driven, by e.g. a hydraulic motor. Hence, this apparatus is constructed as a crawler type traveling apparatus. To the front of this traveling apparatus 3, a dozer 5 is mounted.

The swiveling machine 2 includes a swivel table 6 mounted on the traveling apparatus to be swiveled about a vertical axis X, an implement (excavator) 7 mounted on a front portion of the swivel table 6, a driver's seat 8 mounted on the swivel table 6, and other units mounted on the swivel table 6 including an engine 9, a fuel tank, a hydraulic pump, work oil tank, a radiator etc. The swivel table 6 further mounts thereon a hood 14 for covering the engine 9 and other components such as the fuel tank.

The swivel table 6 consists mainly of a swiveling frame 19 and a counter weight 20 (protector) fixedly attached to a rear portion of the swiveling frame 19 forming a rear portion of the swivel table 6 and providing weight balance relative to the engine 9 and the other units such as the implement 7 mounted on the front portion of the swivel table 6.

Further, right and left side faces of the swiveling frame 19 as well as its front face and upper face disposed in front of the driver's seat 8 are covered with a cover member 23 and others.

The swiveling frame 19 includes a swiveling base plate 22 supported via a swiveling bearing 21 on the traveling apparatus 3 to be swiveled about the vertical axis X and on this swiveling base plate 22, there are fixed a reinforcing member and attachment members for fixedly attaching the various components. Further, on this swiveling base plate 22 constituting a bottom wall of the swivel table 6, there are provided a pair of right and left reinforcing vertical ribs 24, 25 extending from the front portion to the rear portion and across the swiveling axis X.

At he front portion of the swiveling base plate 22, there are supported a pair of upper and lower support brackets 26 projecting forward, and these support brackets 26 pivotally support a swing bracket 27, with the bracket 27 being pivotable to the right and left about a vertical axis.

A boom 28 supported to this swing bracket 27 to be pivotable about a horizontal axis, an arm 29 supported to the leading end of the boom 28 to be pivotable about a horizontal axis, and a bucket 30 attached to the leading end of the arm 28 to be operable for a scooping/dumping operation are the major components of the implement 7. And, these boom 28, the arm 29 and the bucket 30 are operable by means of respective hydraulic cylinders, namely, a boom cylinder 31, an arm cylinder 32 and a bucket cylinder 33.

Inside the hood 14, there is provided a support frame 37 secured to the swivel frame 19. This support frame 37 includes a pair of right and left rear legs 38, a pair of right and left front legs 39 and an upper plate 40 connected to the upper ends of these legs 38, 39. The support frame 37 is disposed over and across the engine 9 and lower ends of the respective rear legs 38 and the front legs 39 are fixedly attached via e.g. a partitioning wall to the swiveling base plate 22 and other members.

Figure 4:
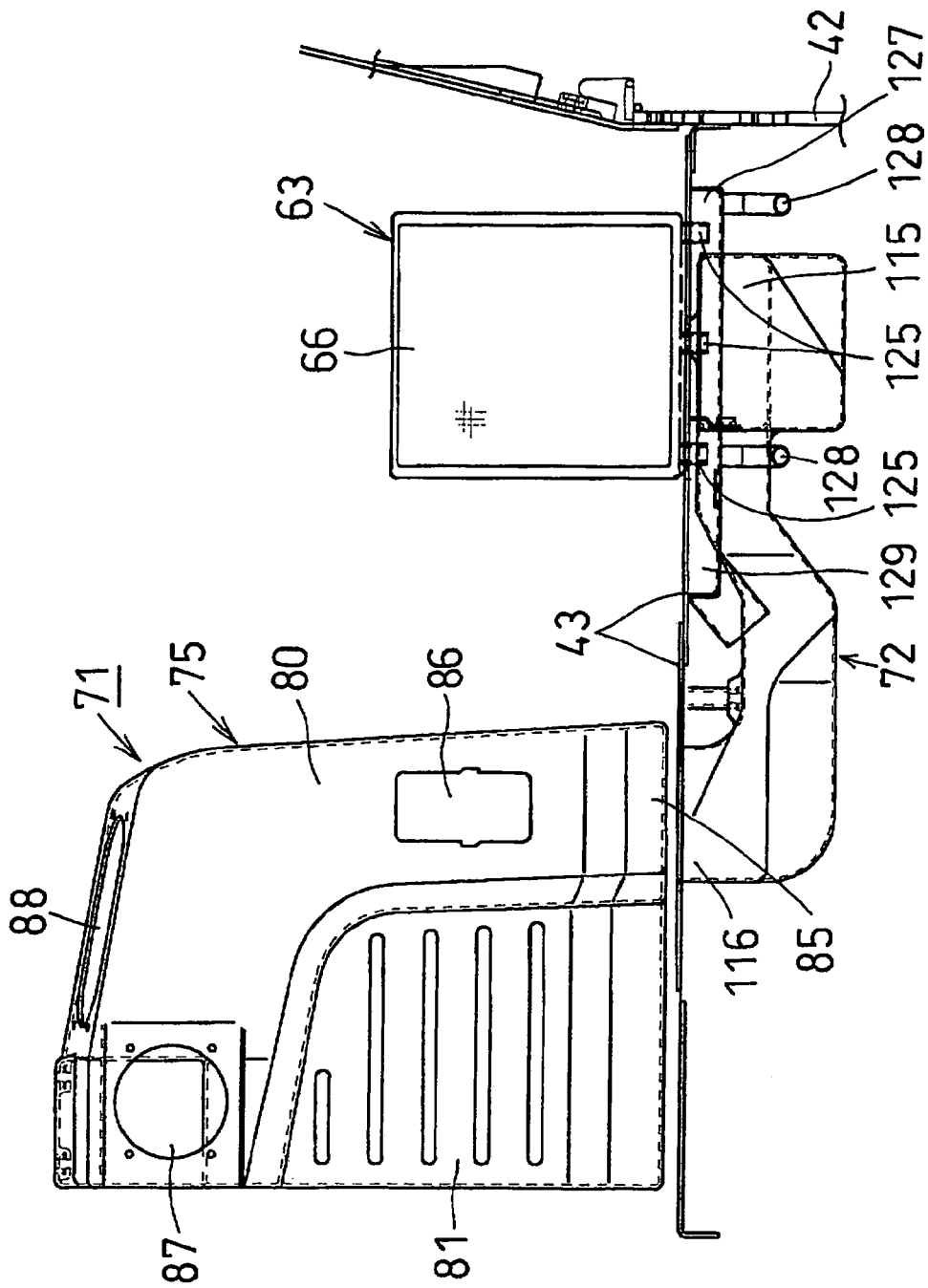
FIG. 4 is a side view showing a portion of the backhoe where an air conditioner is mounted.

The driver's seat 8 is disposed forwardly of the hood 14. As shown also in FIG. 4, a step 43 is supported via a partitioning wall 42 disposed erect on the swiveling base plate 22. This step 43 includes a plurality of plate members and constitutes the upper wall of the swivel table 6. On the step 43, there is disposed a cabin 48, and inside this cabin 48, the driver's seat 8 is supported via a support member 44 disposed erect on the step 43.

On the right and left sides of the driver's seat 8, there are provided a pair of right and left maneuvering platforms 45, and forwardly of the driver's seat 8, there are disposed a pair of right and left traveling control levers 46 for independently operating the right and left crawler traveling members 4. The driver's, seat 8, the maneuvering platforms 45 disposed on the right and left sides of the driver's seat 8 and the other components together constitute a driving control apparatus. And, this driving control apparatus is surrounded by the cabin 48 including an entrance (access or entrance/exit) door 47.

Figure 5:
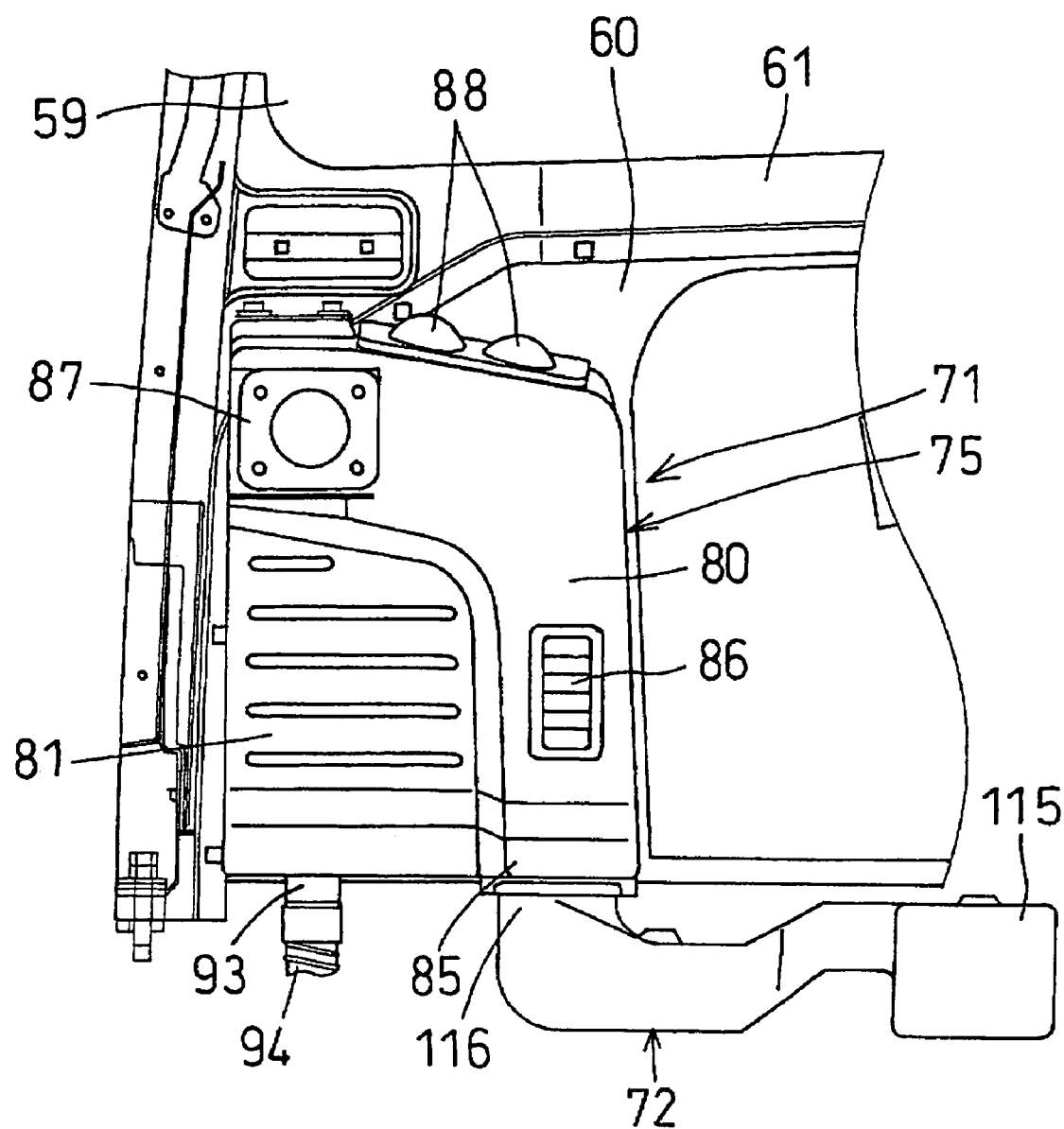
FIG. 5 is a side view showing the inside of a cabin.
Figure 6:
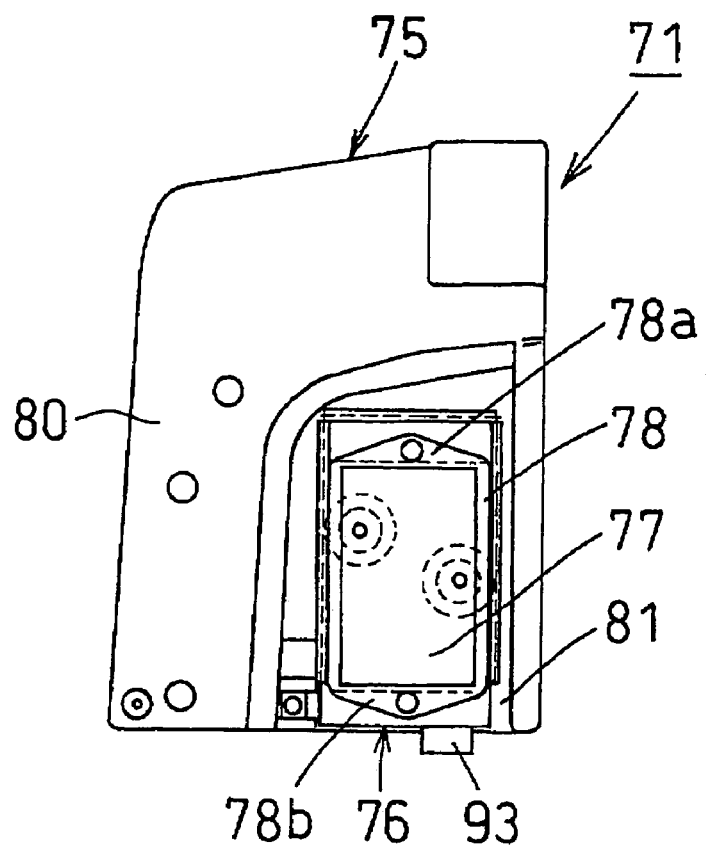
FIG. 6 is a side vie of an air inlet/outlet box
Figure 7:
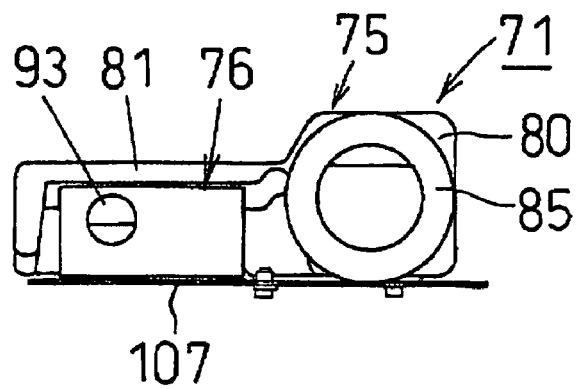
FIG. 7 is a bottom view of the air inlet/outlet box.
Figure 8:
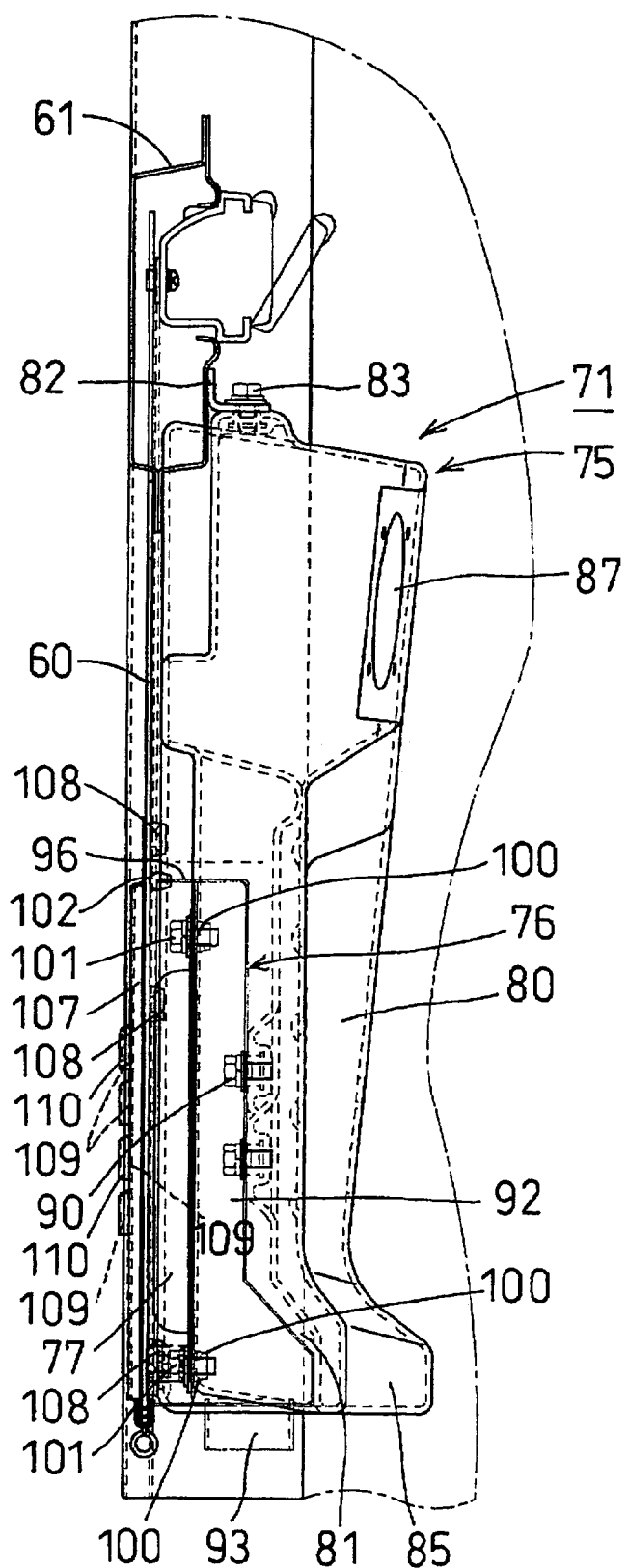
FIG. 8 is a front view in section showing the air inlet/outlet box.
Figure 9:
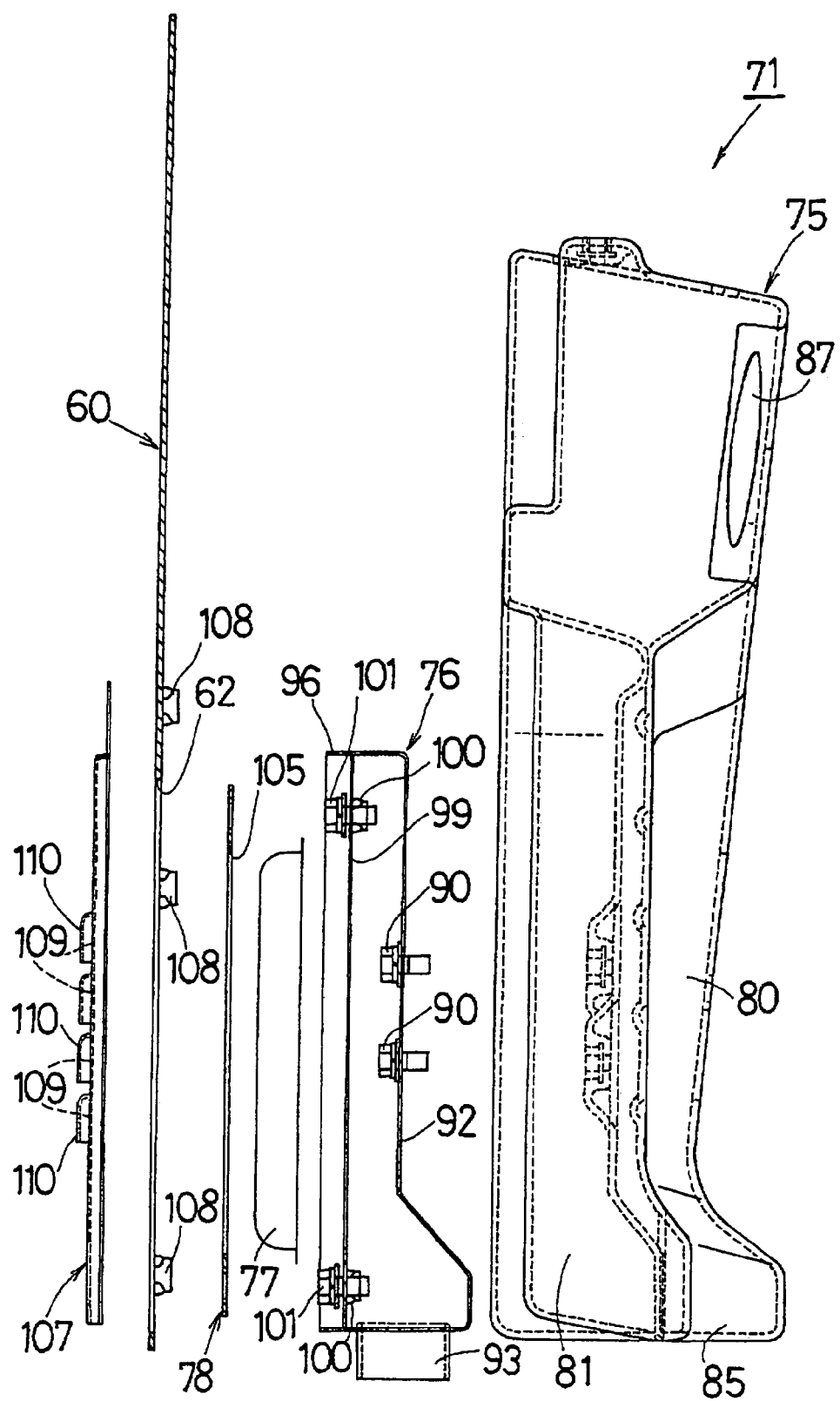
FIG. 9 is an exploded front view of the air inlet/outlet box.
Figure 10:
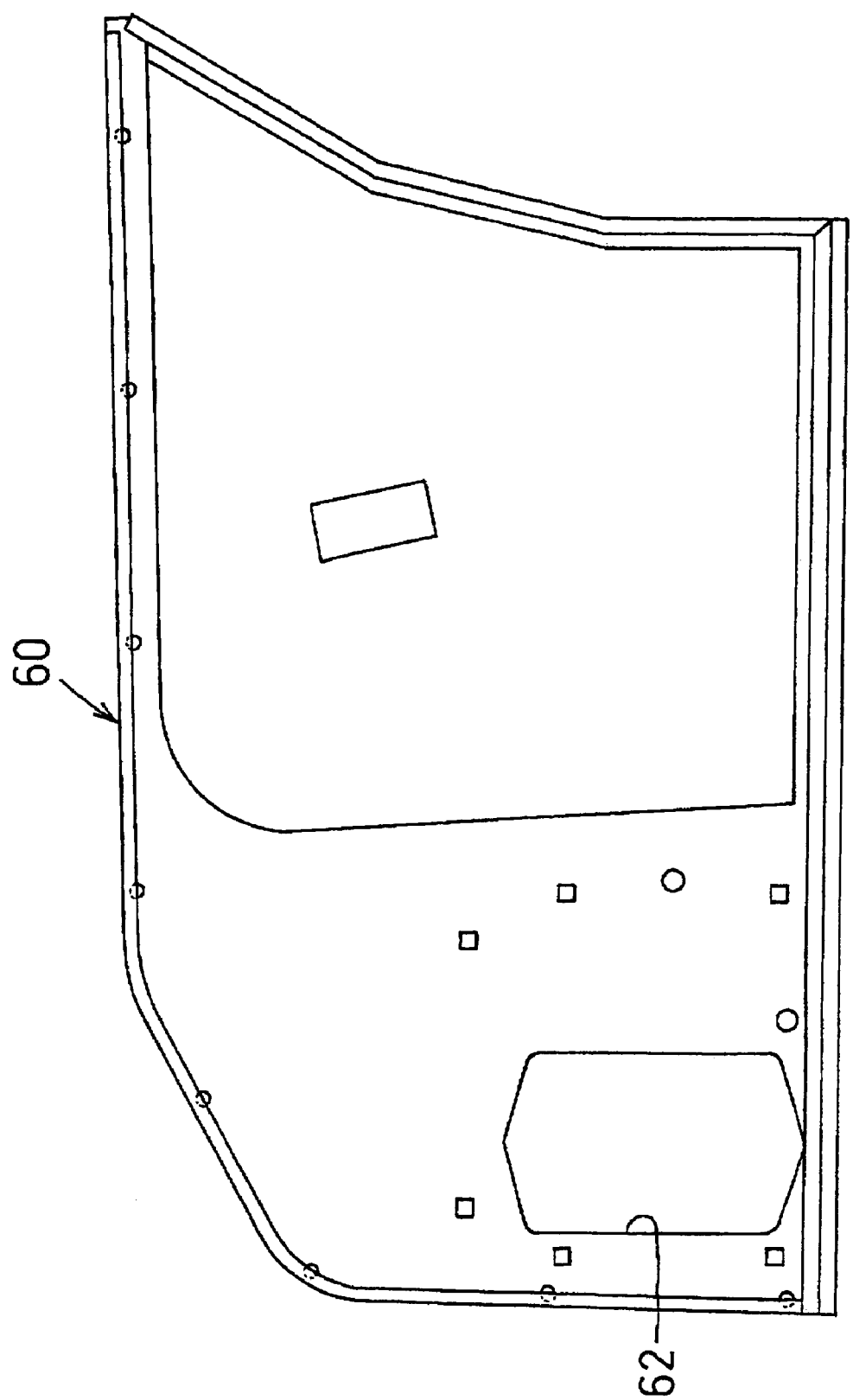
FIG. 10 is a side view of a right-side wall.
Figure 11:
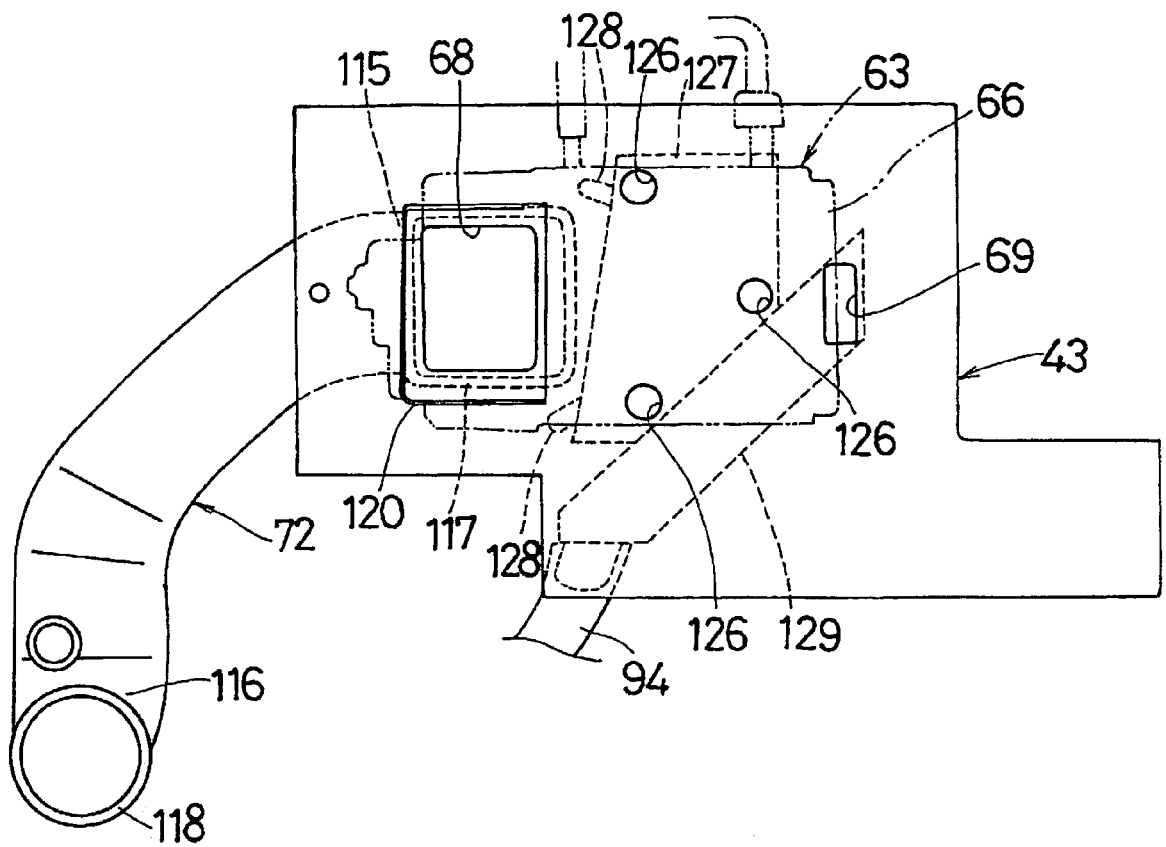
FIG. 11 is a plan view showing a step and a blower pipe.
Figure 12:
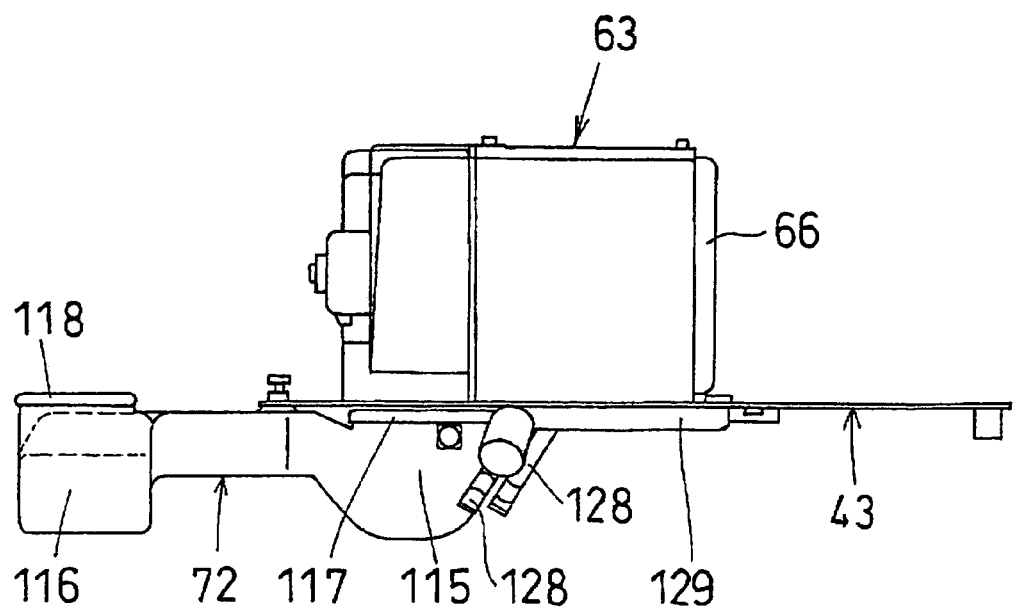
FIG. 12 is a front view showing an air conditioner body and the blower pipe.
Figure 13:
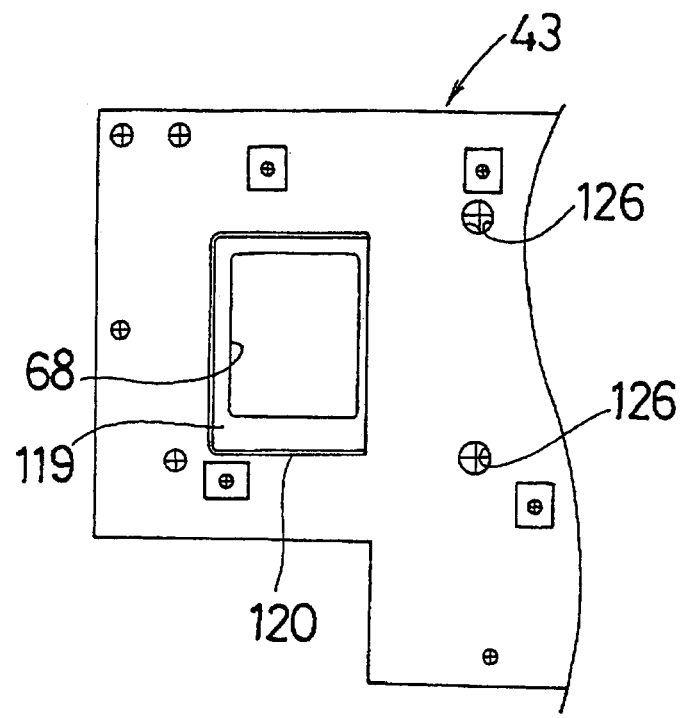
FIG. 13 is a plan view of the step.
Figure 14:
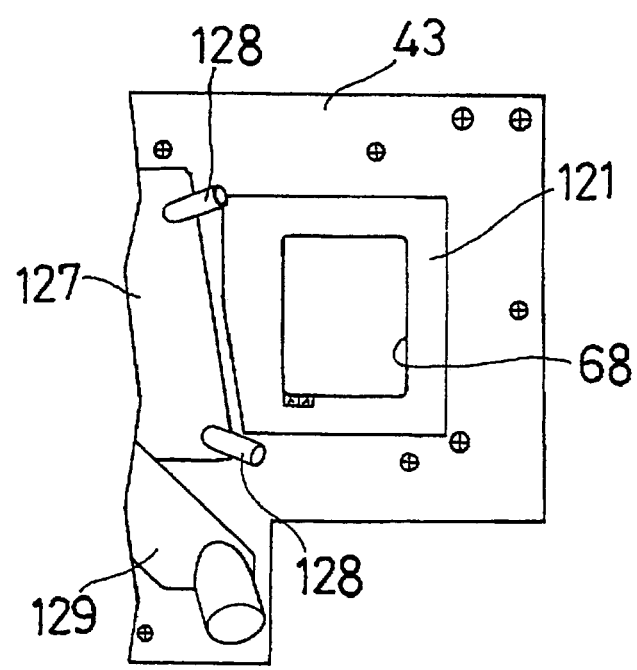
FIG. 14 is a bottom view of the step.
Figure 15:
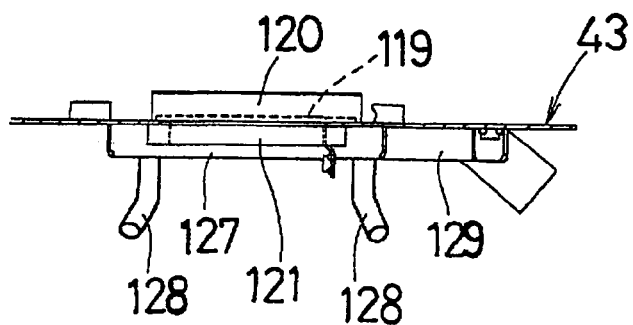
FIG. 15 is a right side view of the step.
Figure 16:
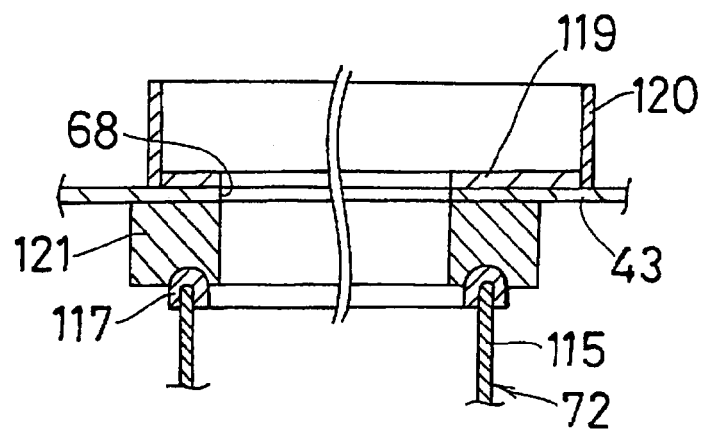
FIG. 16 is a right side view in section showing a rear end of the blower pipe.

As shown in FIG. 1, FIG. 2, and FIG. 5, the cabin 48 is mounted on the swivel table 6 so as to surround the driver's seat 8. This cabin 48 consists mainly of a cabin body 52 and a roof 53.

The cabin body 52 includes a pair of right and left front posts 55R, 55L, an intermediate post 56 offset to the left side and a pair of right and left rear posts 57R, 57L. Between the front posts 55L, 55R, there is provided a front windshield (not shown) and the access door 47 is disposed between the left-side front post 55L and the intermediate post 56, and a side wall frame 61 is disposed between the right-side front post 55R and the right-side rear post 57R. Further, a side glass sheet 59 is disposed at an upper portion of the side wall frame 61 and a right side all 60 shown in FIG. 5 and FIGS. 8–10 and made of metal (iron) is disposed downwardly of the side glass sheet 59. The right side wall 60 is secured by the side wall frame 61 by means of bolts, welding or the like. At the front end of the right side wall 60, there is provided an ambient air introducing window 62.

Inside the hood 14, there are provided various cooler-related components such as a cooler compressor 257, a cooler condenser 258, a cooler receiver (cooling liquid receiving vessel) 259. An air conditioner body 63 is disposed inside the cabin 48 and downwardly of the driver's seat 8. This air conditioner body 63 is disposed on the step 43.

In FIG. 3, FIG. 4, FIG. 11 and FIG. 12, a rear face of the air conditioner body 63 includes a cooling medium inlet and a cooling medium outlet, and at a left side end of this air conditioner body 63, there is provided an air introducing portion 66 and an air outlet is provided on the right side in a bottom face of the air conditioner body 63. The air conditioner body 63 includes an evaporator, an expansion valve and a blower and is operable to cool air introduced from the outside or the inside of the cabin 48 with a cooling medium, and then send out this cooled air and operable also to heat the air introduced from the outside or the inside of the cabin 48 with hot water heated by he engine 9 and then sends out this heated air. In this way, the air conditioner body can be switched over between a cooling operation and a heating operation (piping arrangements for the cooling and the heating will be detailed later). Further, there is provided an inlet fan (not shown) for forcibly introducing air from the air introducing portion 66 into the air conditioner body 63.

The step 43 mounting the air conditioning body 63 and the other components includes an air communicating window 68 in correspondence with the air feeding opening provided in the air conditioner body 63 and an ambient air communicating hole 69 is provided on the left side adjacent the air introducing portion 66 of the air conditioner body 63.

In FIGS. 3 through 10, at a front end inside the cabin 48 and at a right side end thereof on which side the access door 47 is not provided, there is disposed an air inlet/outlet box 71. Further, a blower pipe 72 for sending air from the air conditioner body 63 to the air inlet/outlet box 71 is disposed downwardly of the step 43 and this blower pipe 72 is disposed adjacent the bottom face of the step 43 and attached to the step 43 by means of bolts or the like.

The air inlet/outlet box 71 comprises an integral unit consisting of an inlet portion for introducing ambient air and an outlet portion for feeding air to be conditioned to the inside of the cabin 48. And, this box 71 is attached to a front end of the right-side wall 60 (lateral frame 61) of the cabin 48.

As shown in FIGS. 5 through 9, the air inlet/outlet box 71 includes an outlet member 75 for sending the air from the air conditioner body 63 to the inside of the cabin 48, an inlet member 76 for introducing ambient air into the air conditioner body 63, an ambient air filter 77, and a press plate 78.

The outlet member 75 is formed of e.g. a synthetic resin and integrally includes an L-shaped blower duct 80 having upper and lower portions and front and rear portions and an attaching portion 81 for attachment of the inlet member 76. The outlet member 75 is detachably attached to the side wall frame 61 of the cabin 48 via a stay 82 and using an attaching member 83 such as a bolt. At the lower end of the blower duct 80, there is provided an air inlet 85. A first grill (outlet) 86 is provided at a vertical position on the rear face of the blower duct 80. A second grill 87 is provided on the inner face (left side face) and at a front end of the blower duct 80. Further, in the top face of the blower duct 80, there is provided a third grill 88. Then, the air from the air conditioner body 63 may be sent from these grills 86, 87 and 88 to the inside of the cabin 48. Incidentally, air may be blown from the second grill 87 onto the front windshield of the cabin 48, thereby to provide a defogging effect to the front windshield.

The attaching portion 81 of the outlet member 75 is formed concave toward the inner (left) side in the right/left direction, and into this recess, the inlet member 76 is engaged from the right outer side, so that the inlet member 76 may be fastened and fixed by means of a fastener 90 such as a bolt.

The inlet member 76 includes an ambient air introducing duct 92 formed as an angular tubular member elongate in the vertical direction, and at a lower end of this ambient air introducing duct 92, there is provided an ambient air feeding opening 93 projecting downward. To this ambient air feeding opening 93, an intake hose 94 is connected. Further, on the right side of the inlet member 76 relative to the ambient air introducing duct 92, there is provided a filter accommodating portion 96 which is open on the right side thereof.

The outer wall (right side wall) of the ambient air introducing duct 92 includes an ambient air introducing opening 99 in correspondence with the ambient air introducing window 62 of the right side wall 60. Then, as the press plate 78 presses upper and lower flanges of the ambient air filter 77 against upper and, lower ends of the outer wall of the ambient air introducing duct 92, fasteners 101 such as bolts threadable with nuts 100 will be tightened. With this, the ambient air filter 77 will be housed within the filter accommodating portion 96 and fixed to the outer wall of the inlet member 76 so as to close the ambient air introducing opening 99. Incidentally, the nuts 100 are secured to the outer wall of the ambient air introducing duct 92. The edge of the opening of the filter accommodating portion 96 of the inlet member 76 is placed in tight contact with the right side wall 60 via a trim 102 in such a manner as to surround the ambient air introducing window 62. The press plate 78 includes an ambient air introducing opening 105 in correspondence with the ambient air introducing window 62 of the right side wall 60.

A cover member 107 is attached to the right side wall 60 of the cabin 48 so as to over the ambient air introducing window 62 from the right outer side thereof. This cover member 107 is detachably attached to the right side wall 60 by means of fasteners such as bolts which can be threaded with nuts 108 secured to the right side wall 60. Further, this cover member 107 defines a plurality of ambient air introducing holes 109 communicating with the ambient air introducing window 62 of the right side wall 60 and includes also visors 110 in correspondence with the ambient air introducing holes 109 for preventing intrusion of raindrops or the like from the ambient air introducing holes 109 into the cabin 48.

With the above construction in operation, ambient air is introduced into the ambient air introducing duct 92 from the right outer side of the cabin 48 through the ambient air introducing holes 109 defined in the cover member 107, the ambient air introducing window 62 defined in the right side wall 60, the ambient air filter 77, the ambient air introducing opening 105 defined in the press plate 78 and the ambient air introducing opening 99 of the ambient air introducing duct 92, then, the introduced ambient air may be sent out from the ambient air feeding opening 93. Further, by removing the cover member 107 from the right side wall 60, an operator may insert e.g. his/her finger through the ambient air introducing window 62 and then remove the fasteners 101 and detach the ambient air filter 77 from the ambient air introducing window 62, thereby to replace this ambient air filter 77 easily.

In FIGS. 11–17, at the rear end of the blower pipe 72, there is provided an air inlet (opening end) 115 open upward. Also, at the front end of the blower pipe 72, there is provided an air outlet (opening end) 116 open upward. And, on and around the entire opening edges of the air inlet 115 and the air outlet 116, there are fitted trims 117, 118 respectively.

On the top face of the step 43 at its front portion, there is provided a retaining piece 120 so as to surround the air communicating window 68. On the inner side of the retaining piece 120 on the top face of the step 43, there is provided a seal 119 so as to surround the air communicating window 68. The retaining piece 120 outwardly engages and retains the air outlet of the air conditioner body 63.

To the bottom face of the step 43 at a front portion thereof, there is adhesively bonded a seal 121 so as to surround the air communicating window 68. And, the air inlet 115 of the blower pipe 72 is placed into contact from the under with opening edge of the air communicating window 68 of the step 43 via the trim 117 and the seal 121, whereby the blower pipe 72 is connected to the air conditioner body 63 (i.e. the air outlet of the air conditioner body 63), so that the conditioned air from this air conditioner body 63 may be sent out to the blower pipe 72 without leakage thereof.

Figure 17:
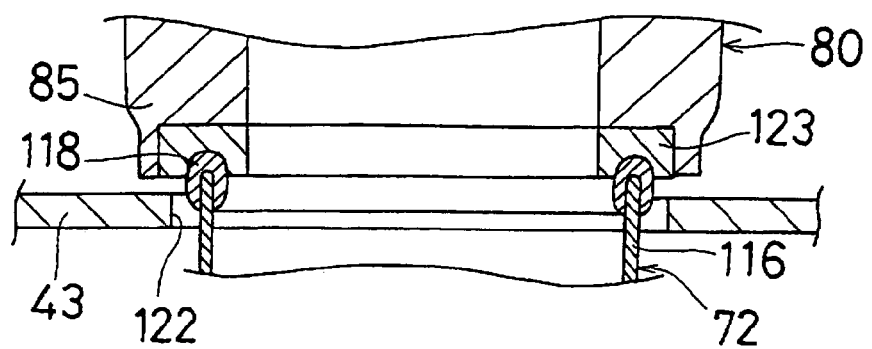
FIG. 17 is a side view in section showing a front end of the blower pipe.

As shown in FIG. 5 and FIG. 17, at a front portion of the step 43, there is provided an inserting window 122 in correspondence with the air inlet 115 of the outlet member 75, and the air outlet 116 of the blower pipe 72 vertically extends through the inserting window 122 of the step 43 from the side of the bottom face of the step 43 and then comes into contact from under with the seal 123 provided within the air inlet 85 of the blower duct 80, whereby the blower pipe 72 is connected with the air inlet/outlet box 71 (air inlet 85) and the conditioned air may be set out from the blower pipe 72 to the blower duct 80 of the outlet member 75 without leakage thereof.

As shown in FIG. 4, FIG. 11, FIG. 12, FIG. 14 and FIG. 15, the air conditioner body 63 includes a plurality of drain pipes 125 (three of them are provided in the figures) for discharging drain water from the air conditioner body 63. Each drain pipe 125 projects downward from the left side of the bottom face of the air conditioner body 63 and then is inserted into the insertion hole 126 defined in the step 43 and finally projects downward from the step 43. On the side of the bottom face of the step 43, there is provided a drain receiver 127 for receiving the drain water from the drain pipes 125 and discharging it downwards. Then, this drain water received in the drain receiver 127 is discharged from a drain outlet 128 via an unillustrated drain hose toward the swivel axis X of the vertical ribs 24, 25.

The intake hose 94 for guiding the ambient air from the inlet member 76 for introducing ambient air to the air conditioner body 63 is disposed on the bottom face of the step 43 and an inlet duct 129 is provided on the downstream side of this inlet hose 94. This inlet duct 129 is formed flat in the vertical direction and is arranged horizontally beside the drain receiver 127. To a front end opening of the inlet duct 129, a downstream end of the inlet hose 94 is connected, whereas a rear end opening of the inlet duct 129 is inserted into the ambient air communicating hole 69 of the step 43.

With the above-described construction in operation, the ambient air from the air inlet/outlet box 71 is guided from the ambient air introducing duct 92 through the inlet hose 94, the inlet duct 129 and then the ambient air communicating hole 69 to the vicinity of the air introducing portion 66 of the air conditioner body 63, so that this ambient air may be fed from the air introducing portion 66 into the air conditioner body 63 and also the air (inside air) present within the cabin 48 may be supplied from the air introducing portion 66 into the air conditioner body 63. In these ways, the introduction of the ambient air and the introduction of the inside air to the air conditioner body 66 are effected simultaneously.

According to the embodiment described above, ambient air is introduced into the ambient air inlet duct 92 from the right outer side of the cabin 48 through the ambient introducing hole 109 defined in the cover member 170, the ambient air introducing window 62 of the right side wall 60, and then the ambient air filter 77. This introduced ambient air is guided from the ambient air inlet duct 92 through the inlet hose 94 and the inlet duct 129 and then discharged from the ambient air communicating hole 69 to the vicinity of the air introducing portion 66 of the air conditioner body 63. At the same time, the inside air present within the cabin 48 is supplied through the air introducing portion 66 into the air conditioner body 63. Therefore, the introduction of the ambient air and the introduction of the inside air to the air conditioner body 66 take place at the same time, so that a sufficient amount of air can be supplied thereto.

Moreover, the conditioned air from the air conditioner body 63 is sent out from the blower pipe 72 disposed downwardly of the step 43 to the blower duct 80 of the outlet member 75 and then sent through the first grill 86, the second grill 78 and the third grill 88 of the blower duct 80 into the cabin 48.

In the above construction, since the air conditioner body 63 is disposed downwardly of the driver's seat 8, this air conditioner body 63 will not limit the free space in the cabin 48 or not interfere with an operator's operation to be effected therein. Moreover, since the inlet member 76 and the outlet member 75 are assembled into the single unit, i.e. the air inlet/outlet box 71, these members can be formed as compact as possible. Further, since this air inlet/outlet box 71 is provided to the right side end of the cabin 48 at the front end thereof, on which side the access door is not provided, this air inlet/outlet box 71 too will not limit the free space within the cabin 48, or interfere with an operator's operation to be effected therein. In addition, since the blower pipe 72 is disposed downwardly of the step 43, this blower pipe 72 too will not limit the free space within the cabin 48 or interfere with an operator's operation to be effected therein.

Also, since the inlet member 76 for introducing ambient air to the air conditioner body 63 and the outlet member 75 for sending the air from the air conditioner body 63 into the cabin 48 are provided as a single unit as the air inlet/outlet box 71, it is not necessary to assemble the inlet member 76 and the outlet member 75 separately and then to mount each of these members within the cabin 48 separately. Instead, the inlet member 76 and the outlet member 75 may be assembled together easily and then this assembly can be mounted inside the cabin 48 also easily. This construction facilitates also the connecting operation for connecting the inlet member 76 and the outlet member 75 to the air conditioner body 63.

Further, for replacement of the ambient air filter 77, this can be easily done by removing the cover member 107 from the right side wall 60 and then removing the ambient air filter 77 out of the ambient air introducing window 62. Then, the ambient air filter 77 can be replaced easily.

Figure 18:
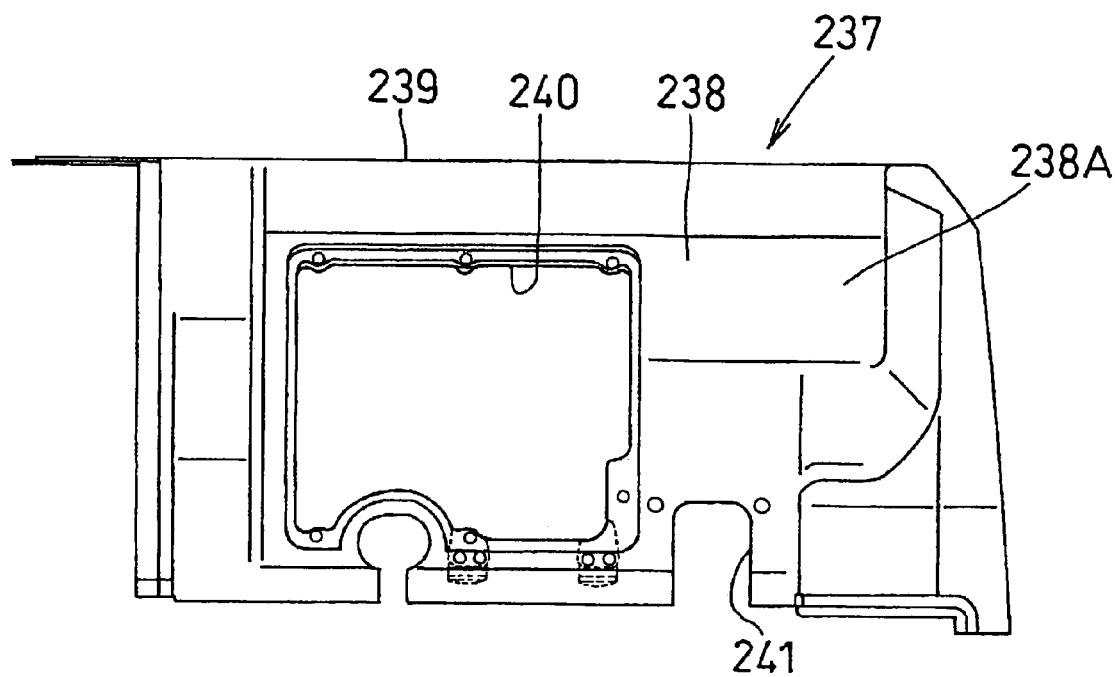
FIG. 18 is a front view of a center hood member.
Figure 19:
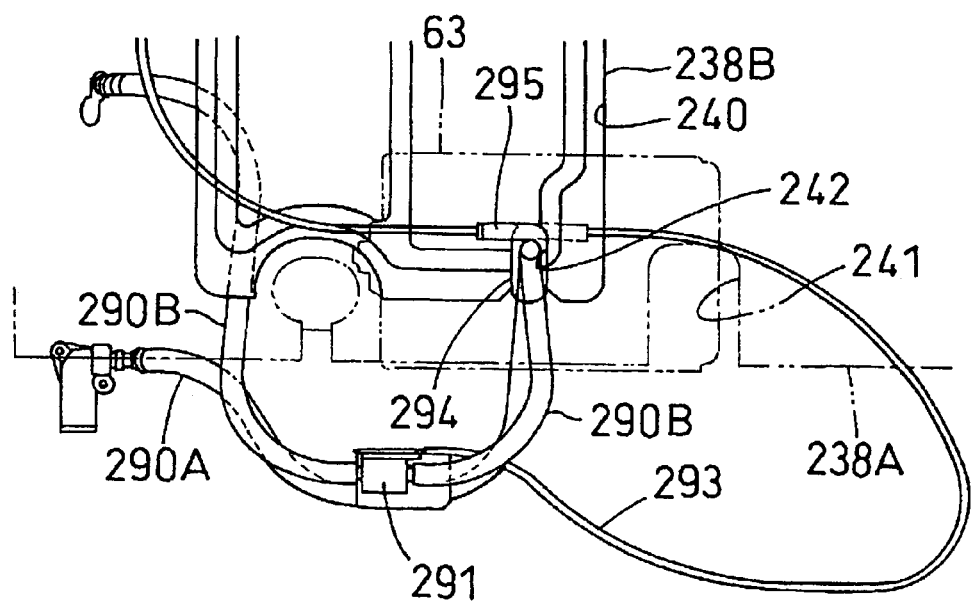
FIG. 19 is a front view showing a piping arrangement of heater hoses.
Figure 20:
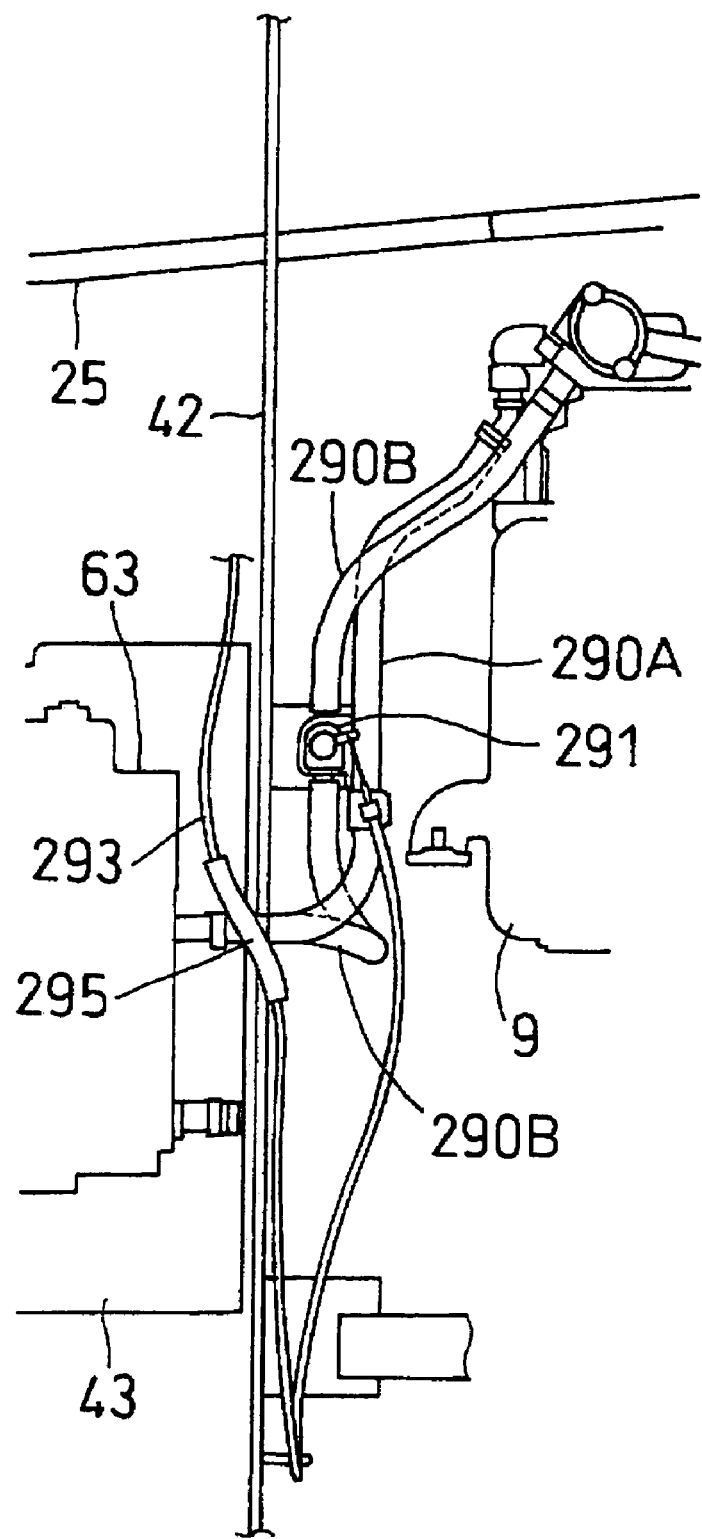
FIG. 20 is a plan view showing the piping arrangement of the heater hoses.
Figure 21:
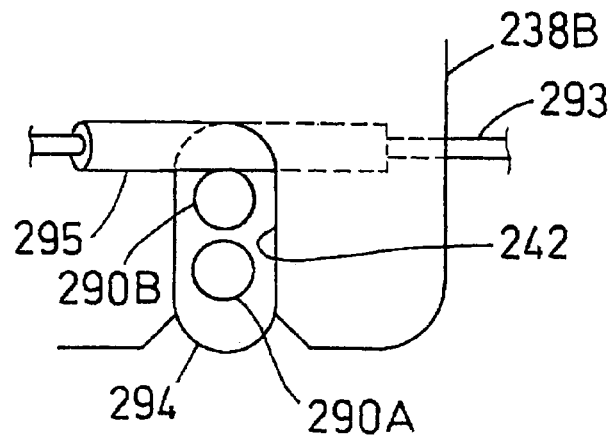
FIG. 21 is a front view showing inserting portions of the heater hoses and other members into the center hood member.
Figure 22:
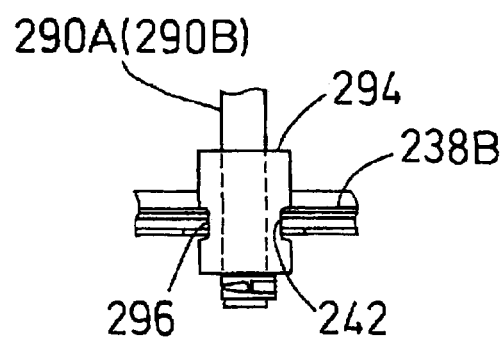
FIG. 22 is a plan view showing the inserting portion of the heater hoses into the center hood member.
Figure 23:
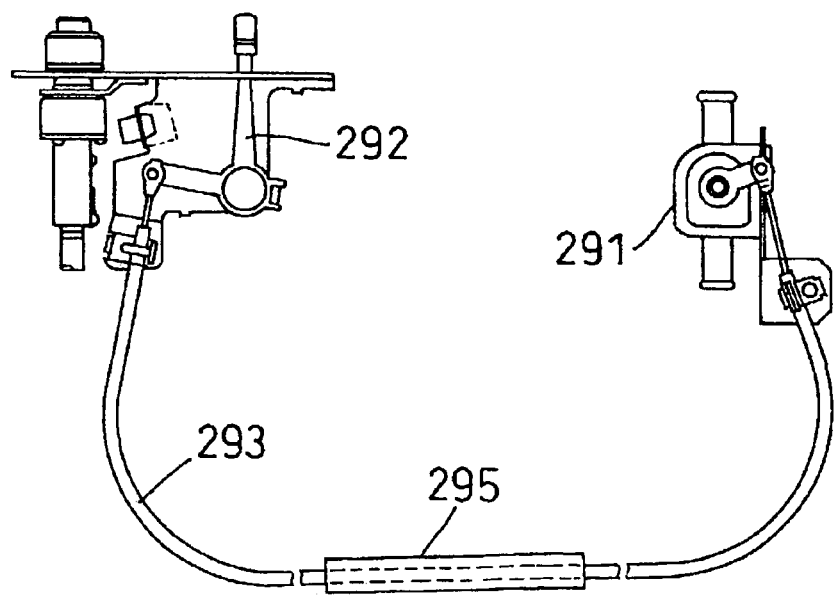
FIG. 23 is a schematic showing an operational mechanism for a selector valve.

As shown in FIG. 2, FIG. 18 and FIG. 19, the hood 12 includes a center hood member (fixed hood member, a cover member) 237 forming a right/left-wise center of the hood. This center hood member 237 includes a front wall 238 covering a front portion of the engine 9 (i.e. constituting a front wall of a space accommodating the engine 9 and other components) and an upper wall 239. The right and left sides and the rear side of the hood are open.

The front wall 238 consists mainly of a main body portion 238A having an opening 240 for providing access for maintenance and a lid plate 238B for closing the opening 240.

Further, at a lower-left portion of the main body portion 238A and at a lower portion of the lid plate 283B, there are provided cutouts 241, 242 which are open downward.

As shown in FIGS. 19–23, forward and return hoses (an example of air conditioning medium piping) 290A, 290B for the heater of the air conditioner are provided, and one end of each hose is connected to a heat exchanger incorporated in the air conditioner body 63 and extends from the air conditioner body 63 through the front wall 238 of the center hood member 237 to be disposed inside the hood 12 while the other end of the tube is connected to a water jacket provided in the engine 9. In operation, hot water heated in the water jacket flows through the one heater hose 290A into the heat exchanger in the air conditioner body 63, and air introduced into the air conditioner body 63 is heated by the heat exchanger whereas the hot water introduced in the heat exchanger is returned via the other heater hose 290B to the water jacket.

Further, the return hose 290B for the hot water of the heater is divided in midway thereof and at this divided (connected) portion, there is incorporated a selector valve 291, which valve 291 selectively provides a condition for flowing the hot water and a condition for not flowing the hot water.

The selector valve 291 is operably coupled via a push/pull cable 293 to a control lever 292 provided on the maneuvering platform 45, so that an operator seated at the driver's seat 8 can effect a switchover operation of this selector valve 291 by operating the control lever 292.

The heater hoses 290A, 290B and the push/pull cable 293 are inserted through the cutout 242 provided in the lid plate 238B of the front wall 238 of the center hood member 237. Further, a cushioning member 294 is engaged on the portion of the cutout 242 where the heater hoses 290A, 290B are inserted and a seal 295 is provided at this inserting portion of the cutout 292.

The cushioning member 294 and the seal 295 together provide sealing between the engine room (inside of the hood 14) and the inside of the cabin 48.

The cushioning member 294 defines a groove portion 296 for engagement with the edges of the cutout 242.

Referring now to the piping arrangement of the heater hoses 290A, 290B, first, the heater hoses 290A, 290B and the push/pull cable 293 will be inserted into the opening 240 of the front wall 238 of the center hood member 237 and then inserted from the lower end of the cutout 242 with the seal 295 engaged on the push/pull cable 293. Thereafter, the cushioning member 294 will be inserted from the lower end of the cutout 242 so as to engage the groove 296 of the cushioning member 294 with the edge of the cutout 242 on which the cushioning member 294 is engaged. Under this condition, the lid plate 238B will be attached to the main body portion 238A of the front wall 238. With this, the heater hoses 290A, 290B and the push/pull cable 293 can, be readily arranged through the center hood member 237.

Figure 24:
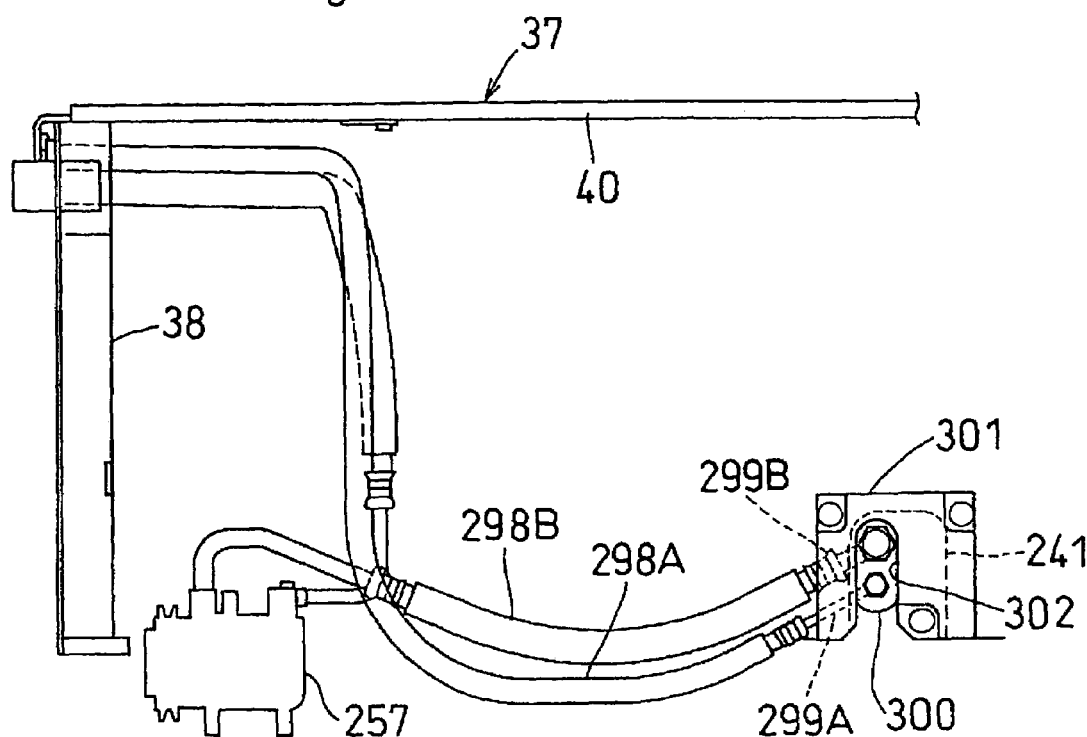
FIG. 24 is a front view showing a piping arrangement of cooler hoses.
Figure 25:
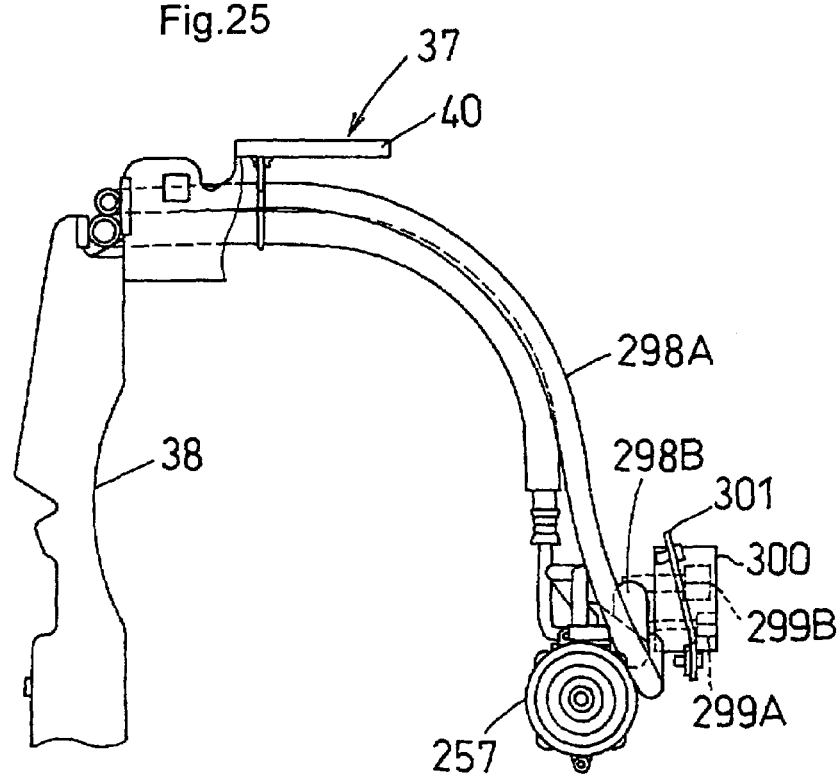
FIG. 25 is a side view showing the piping arrangement of the cooler hoses.

As shown in FIG. 3, FIG. 24 and FIG. 25, a forward cooler hose (an example of air conditioning medium piping) 298A for feeding the cooling medium sent from the compressor 257 through the condenser 258 and the receiver 259 to the evaporator of the air conditioner body 63 and a return cooler hose (example of air conditioning medium piping) 298B for returning the medium from the evaporator of the air conditioner body 63 to the compressor 257 are caused to extend through the cutout 241 defined in the main body portion 238A of the front wall 238 of the center hood member 237 to be eventually connected to the air, conditioner body 63.

At terminal ends of the cooler hoses 298A, 298B, there are provided connecting members 299A, 299B to be connected to respective connecting portions of the air conditioner body 63. On these connecting portions of the cooler hoses 298A, 298B connected to the air conditioner body 63, there is engaged a cushioning member 300, and this cushioning member 300 is engaged with a cutout 302 having an open lower end and formed in a cover 301 having heat insulating material affixed thereto. This cover 301 is fixedly attached by means of bolts or the like to the front wall 238 of the center hood member 237. The cushioning member 300 provides sealing between the engine room (inside of the hood 14) and the inside of the cabin 48.

Referring to the piping arrangement of the cooler hoses 298A, 298B having the above-described constructions, e.g. after the cooler hoses 298A, 298B are connected to the air conditioner body 63, at these connected portions, the cushioning member 300 will be fitted for providing the sealing and also this cushioning member 300 will be attached to the cover 301 and then the cover 301 will be attached to the front wall 238, thereby to complete connections of the cooler hoses 298A, 298B. Then, the center hood member 238 can be easily mounted.

[Other Embodiments]

Figure 26:
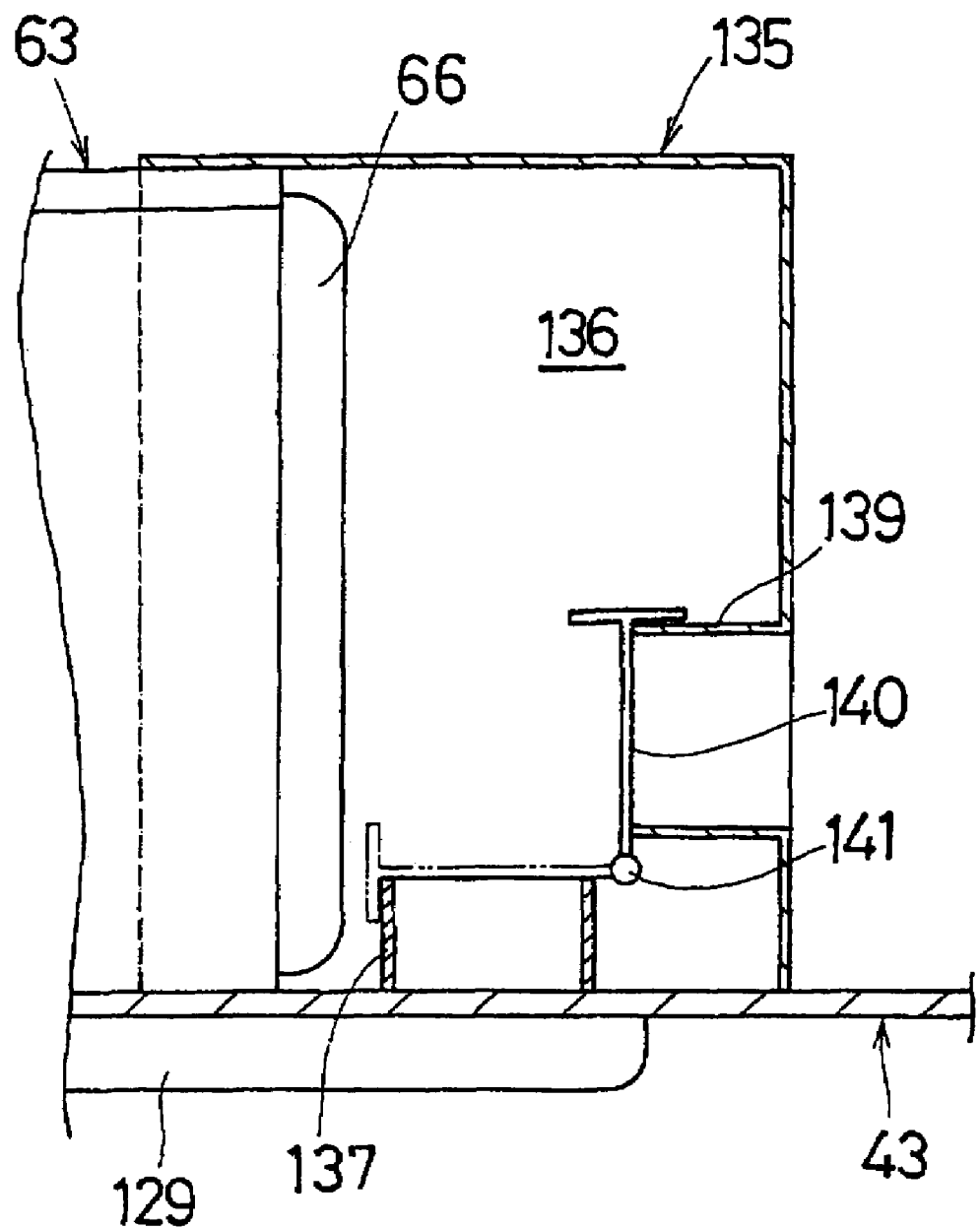
FIG. 26 is a front view in section showing a further embodiment of the invention.

(1) FIG. 26 shows a further embodiment of the present invention. In this, at the left end of the air conditioner body 63, there is fixed a seal cover 135 projecting outward therefrom. This seal cover 135 and the step 43 together define therebetween a sealed space 136 on the outside of the air conditioner body 63. On the left side of the air introducing portion 66 of the air conditioner body 63, there is provided an ambient air feeding opening 137 of the inlet duct 129 extending through the step 43 into the sealed space 136. Further, on the outer wall of the seal cover 135, there is formed a cylindrical inside air inlet 139 projecting inward. Inside the sealed space 136, there is provided a lid member 140 for closing the ambient air feeding opening 137 and the inside air inlet 139. This lid member 140 is pivotable about a support shaft 141 extending in the fore/aft direction, so as to selectively close either the ambient air feeding opening 137 or the inside air inlet 139. Further, this lid member 140 is pivotally operable from the driver's seat 8 by means of an unillustrated link mechanism and a motor. Accordingly, ambient air or the inside air can be selectively introduced into the air conditioner body 63. The rest of the construction of this further embodiment is identical to that of the foregoing embodiment.

(2) In the foregoing embodiment, the inlet member 76 and the outlet member 75 are provided as separate members and with the attachment of the inlet member 76 within the outlet member 75, there is formed the unit (integrated) inlet/outlet box 71. Instead, the inlet member 76 and the outlet member 75 may be formed integrally of e.g. a synthetic resin, thereby to provide the unit type (integrated) inlet/outlet box 71.

(3). Further, in the foregoing embodiment, the inlet/outlet box 71 is provided at the front end inside the cabin 47 and at the right end of this cabin 48. Instead, this inlet/outlet box 71 may be disposed at the left end inside the cabin 48, and this box 71 may be attached to the left-side wall of the cabin 48.

As described above, according to the present invention, the air conditioner body, the inlet member, the outlet member and the blower pipe do not limit the free space inside the cabin or interfere with an operator's operation therein, thereby to improve the comfort in the cabin.

The present invention may be embodied in any other manner than described above. Various modifications thereof will be apparent for those skilled in the art without departing from the essential concept thereof defined in the appended claims.

What is claimed is:

1. A work vehicle comprising:
   a cabin;
   a driver's seat provided in the cabin;
   a platform disposed downwardly of the cabin for providing access for a driver to the driver's seat; and
   an air conditioner for conditioning air inside the cabin, the air conditioner having an air conditioner body, an air inlet/outlet box, and a blower pipe for sending conditioned air from the air conditioner body to the air inlet/outlet box and an inlet pipe for feeding ambient air from the air inlet/outlet box to the air conditioner body;
   wherein the cabin includes an entrance door mounted to one lateral side thereof and includes said air inlet/outlet box mounted to the other lateral side thereof, said air conditioner body is disposed downwardly of the driver's seat; and
   wherein said blower pipe and said inlet pipe are disposed downwardly of said platform.

2. The work vehicle according to claim 1, wherein the air inlet/outlet box includes an inlet member for introducing the ambient air into the air conditioner body and an outlet member for sending the conditioned air from the air conditioner body to the inside of the cabin, said inlet and outlet members being provided as a single unit.

3. The work vehicle according to claim 2, wherein the air inlet/outlet box includes a filter attachable and detachable from said one lateral side of the cabin and said one lateral side of the cabin includes an ambient air introducing window and a cover member for covering this ambient air introducing window, said filter being replaceable through said ambient air introducing window by opening said cover member.

4. The work vehicle according to claim 3, wherein said cover member includes an ambient air introducing hole communicating with said ambient air introducing window, said ambient air introducing hole being communicated via said ambient air introducing window and the ambient air filter with said inlet member.

5. The work vehicle according to claim 2, wherein the introduction of the ambient air from the inlet portion to the air conditioner body and the introduction of the air inside the cabin to the air conditioner body are effected at one time.

6. The work vehicle according to claim 5, wherein said air conditioner body includes an air introducing portion for effecting the introduction of the ambient air from the inlet member to the air conditioner body and the introduction of the inside air from the inside of the cabin to the air conditioner body.

7. The work vehicle according to claim 6, wherein there are provided an ambient air feeding opening formed in a bottom face of the inlet member to communicating the ambient air therefrom to the introducing portion through said inlet pipe.

8. The work vehicle according to claim 2, wherein the introduction of the ambient air from the inlet portion to the air conditioner body and the introduction of the air inside the cabin to the air conditioner body are selectively effected.

9. The work vehicle according to claim 1, wherein there are provided an engine disposed at a rear portion of a vehicle body and a cover member having a front wall for covering at least a front portion of the engine, an air conditioning medium pipe of the air conditioner being inserted through said front wall of the cover body, with an inserted portion of the medium pipe being sealed with a cushioning member.

* * * * *

UNITED STATES PATENT AND TRADEMARK OFFICE
CERTIFICATE OF CORRECTION

PATENT NO. : 7,021,074 B2 Page 1 of 1
APPLICATION NO. : 10/785725
DATED : April 4, 2006
INVENTOR(S) : Hara et al.

It is certified that error appears in the above-identified patent and that said Letters Patent is hereby corrected as shown below:

Column 12, Line 35, Claim 7, "to communicating" should read -- to communicate --

Column 12, Line 36, Claim 7, "the introducing" should read -- the air introducing --

Signed and Sealed this

Twelfth Day of September, 2006

JON W. DUDAS
*Director of the United States Patent and Trademark Office*